United States Patent [19]

Koden et al.

[11] Patent Number: 5,151,214

[45] Date of Patent: Sep. 29, 1992

[54] FERROELECTRIC LIQUID CRYSTAL DEVICE

[75] Inventors: Mitsuhiro Koden; Tomoaki Kuratate, both of Nara; Fumiaki Funada, Yamatokoriyama; Kazuhiko Sakaguchi, Toyonaka; Tohru Kitamura, Kyoto, all of Japan

[73] Assignee: Sharp Kabushiki Kaisha, Osaka, Japan

[21] Appl. No.: 592,909

[22] Filed: Oct. 4, 1990

[30] Foreign Application Priority Data

Oct. 6, 1989 [JP] Japan .................................. 1-262789

[51] Int. Cl.$^5$ ...................... C09K 19/34; C09K 19/12; G02F 1/13
[52] U.S. Cl. .......................... 252/299.61; 252/299.66; 359/103
[58] Field of Search ...................... 252/299.61, 299.66; 350/350 S

[56] References Cited

U.S. PATENT DOCUMENTS

| | | | |
|---|---|---|---|
| 4,596,667 | 6/1986 | Inukai et al. | 252/299.65 |
| 4,808,333 | 7/1985 | Huynh-ba et al. | 252/299.66 |
| 4,874,542 | 10/1989 | Higuchi et al. | 252/299.61 |
| 4,909,957 | 3/1990 | Sakaguchi et al. | 252/299.61 |
| 4,913,532 | 8/1990 | Yoshida et al. | 350/350 R |
| 4,973,425 | 11/1990 | Kazuhiko et al. | 252/299.61 |
| 5,026,506 | 6/1991 | Koden et al. | 252/299.61 |

FOREIGN PATENT DOCUMENTS

| | | |
|---|---|---|
| 0355830 | 2/1990 | European Pat. Off. |
| 0384432 | 8/1990 | European Pat. Off. |
| 0390556 | 10/1990 | European Pat. Off. |
| 61-67829 | 4/1986 | Japan .............................. 350/350 S |

OTHER PUBLICATIONS

Nakauchi, J. et al., "Novel Ferroelectric Liquid Crystals with Very Large Spontaneous Polarization", *Japan. J. of Applied Physics,* vol. 28, No. 7, Jul. 1989, pp. L 1258–1260.

*J. Am. Chem. Soc.,* 1986, 107 7424–7425.

*Primary Examiner*—Robert L. Stoll
*Assistant Examiner*—C. Harris
*Attorney, Agent, or Firm*—David G. Conlin; Linda M. Buckley

[57] ABSTRACT

An improved ferroelectric liquid crystal device comprising a pair of substrates each provided with voltage applying means, at least one of the substrates having an orientation control layer, and a ferroelectric liquid crystal layer disposed between the pair of substrates, the ferroelectric liquid crystal layer comprising specific γ-lactone derivatives, which is useful as a liquid crystal shutter, liquid crystal display device or the like.

7 Claims, 1 Drawing Sheet

FERROELECTRIC LIQUID CRYSTAL DEVICE

BACKGROUND OF THE INVENTION

1. Field of the Invention

This invention relates to a ferroelectric liquid crystal device and more particularly to a ferroelectric liquid crystal device which comprises substrates, voltage applying means, an orientation control layer and a ferroelectric liquid crystal composition layer and is usable as a liquid crystal shutter, a liquid crystal display device or the like.

2. Description of the Related Art

Liquid crystal display devices most widely used at present are those utilizing nematic phase, but they have a drawback such that a display of large capacity such as of 2,000×2,000 lines is hard to realize. Specifically, in ordinary twisted nematic (TN) type liquid crystal display devices, contrast decreases as the number of lines increases, so that it is nearly impossible in practice to produce a display device of large capacity such as of 2,000×2,000 lines, with a good appearance.

In order to eliminate the drawback of the TN type liquid crystal display devices, liquid crystal display devices of super twisted nematic (STN) type and double super twisted nematic (DSTN) type have been developed. However, they also have a drawback such that contrast and response speed decrease as the number of lines increases. Therefore, it is presently the utmost level that such display devices be provided with a display capacity of approximately 480×1920 lines.

On the other hand, there has been also developed a liquid crystal display device of active matrix type where thin film transistors (TFT) are arranged on a substrate, whereby a large capacity display of 1,000×1,000 lines and the like can be realized technically. However, the device has a drawback such that its production process takes a longer time with poor yield, leading to a very high production cost.

A means to solve the problems described above, a ferroelectric liquid crystal display device, which is proposed as a liquid crystal display based on a principle different from that for the TN type display device, has been expected to be promising (See N. A. Clark, et al, Appl. Phys, Lett., 36, 899 (1980)). In such a display device, a ferroelectric liquid crystal capable of exhibiting chiral smectic C phase, chiral smetic I phase, etc. is utilized. Because the principle of the device is classified in a type utilizing memory characteristics of the liquid crystal, a larger display capacity may potentially be realized if response speed improves. Because the process does not require an active element such as thin film transistor, the cost for producing the liquid crystal device may not rise.

Furthermore, the ferroelectric liquid crystal device has also a merit of a wide view angle, so that it is considered promising as a device for a display of a larger capacity of 2,000×2,000 lines.

Liquid crystal materials used in a ferroelectric liquid crystal display device utilizing the smectic C phase abovesaid is required to exhibit smectic C phase within a wide temperature range of which center is around room temperature. The liquid crystal materials is also required to satisfy various conditions such as high speed response as a device property for realizing a larger capacity display at the first. In this regard, liquid crystal materials are to show large spontaneous polarization and lower viscosity. Furthermore, possessing phase sequence such as IAC (Isotropic-Smectic A-Smectic C) or INAC (Isotropic-Nematic-Smectic A-Smectic C) is required in order to obtain good orientation and bistability when the ferroelectric liquid crystal is applied to a liquid crystal cell, which also requires that a spiral pitch of nematic phase and smectic C phase be sufficiently longer than the thickness of cell. Also, possessing a large tilt angle is needed in order to improve contract and brightness in liquid crystal display.

However, it is impossible at present to satisfy all of such requirements with a single compound. Therefore, a plurality of compounds are mixed together and practically applied as a liquid crystal composition but a sufficiently satisfying liquid crystal composition has not yet been realized. For producing a liquid crystal composition which satisfies practically usable requirements, many single liquid crystal compounds having various properties are to be used in combination and it may require as a content of liquid crystal composition a compound without showing any liquid crystal phase.

SUMMARY OF THE INVENTION

The present invention has been accomplished under the foregoing situations and is to provide a ferroelectric liquid crystal device comprising such a ferroelectric liquid crystal composition having a wider operable temperature range, a good orientation and memory characteristic, and a high-speed response at room temperature.

According to the present invention, there is provided a ferroelectric liquid crystal device comprising a pair of substrates each provided with voltage applying means, at least one of the substrates having an orientation control layer, and a ferroelectric liquid crystal layer disposed between the pair of substrates, the ferroelectric liquid crystal comprising at least one compound represented by the following general formula (I):

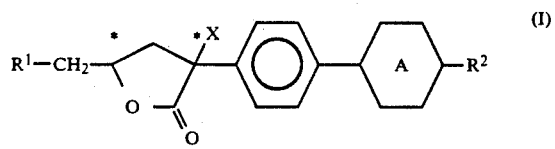

(I)

wherein $R^1$ and $R^2$ may be identical or different from each other and independently represent an alkyl group or an alkyloxy group, having 1 to 15 carbon atoms with straight or branched chains;

represents

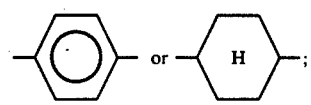

X represents a hydrogen atom or a methyl group, and * represents that the carbon atom is asymmetric, and at least one compound represented by the following general formula (II):

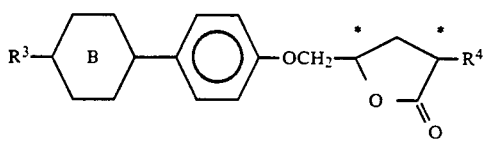
(II)

wherein $R^3$ and $R^4$ may be identical or different from each other and independently represent an alkyl group, having 1 to 15 carbon atoms with straight or branched chains;

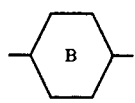

represents

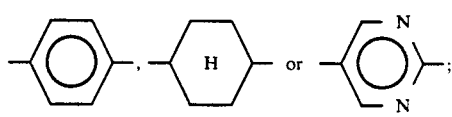

and * represents that the carbon atom is asymmetric.

The ferroelectric liquid crystal device of the present invention has a good orientation characterisitic, shows a higher contrast developing a bright display and permits a wider operable temperature range, so that it is usable as a liquid crystal device of large capacity for display and photoswitching.

DETAILED DESCRIPTION OF THE PREFERRED EMBODIMENT

Figure 1:
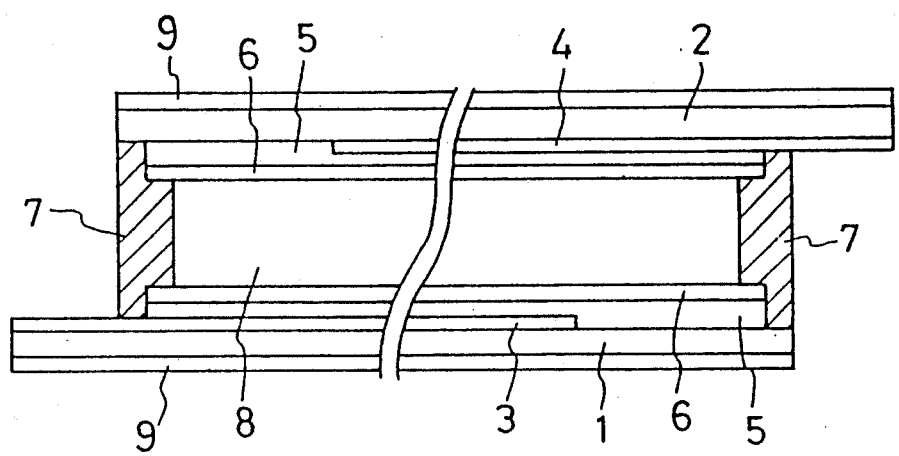
FIG. 1 is a sectional view illustrating a constitution of a ferroelectric liquid crystal device of an embodiment of the present invention.

The compound represented by the general formula (I) described above, which is used in the ferroelectric liquid crystal device of the present invention, has not been disclosed in any literature.

The compound represented by the general formula (I) being an optically active compound may be cis-form or trans-form. Either form may be applicable to the present invention or the forms may be used in combination.

$R^1$ and $R^2$ in the general formula (I) abovementioned each represents an alkyl group or an alkyloxy group. Specific examples of the alkyl group include methyl, ethyl, propyl, i-propyl, butyl, i-butyl, pentyl, 1- or 2-methylbutyl, hexyl, 1- or 3-methylpentyl, heptyl, 1- or 4-methylhexyl, octyl, 1-methylheptyl, nonyl, 1- or 6-methyloctyl, decyl, 1-methynonyl, undecyl, 1-methyldecyl, dodecyl, 1-methylundecyl and the like, and specific examples of the alkyloxy group include methoxy, ethoxy, propoxy, i-propoxy, butoxy, i-butoxy, pentoxy, 1- or 2-methylbutoxy, hexyloxy, 1- or 3-methypentoxy, heptyloxy, 1- or 4-methylhexyloxy, octyloxy, 1-methylheptyloxy, nonyloxy, 1- or 6-methyloctyloxy, decyloxy, 1-methylnonyloxy, undecyloxy, 1-methyldexyloxy, dedocyloxy, 1-methylundecyloxy and the like.

The alkyl group or alkyloxy group may contain asymmetric carbon(s) in the carbon chains thereof.

The compound represented by the general formula (I) may be prepared by such a method as illustrated by the following scheme.

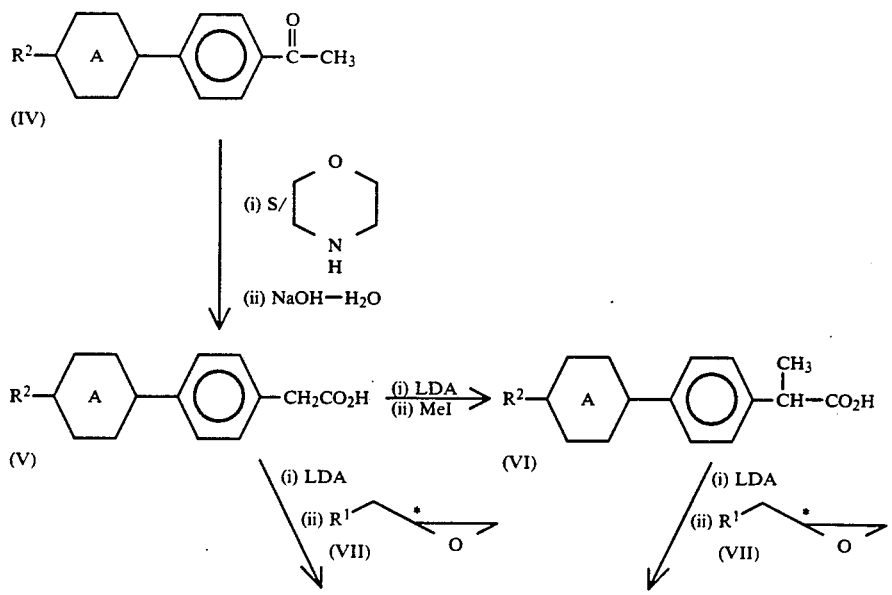

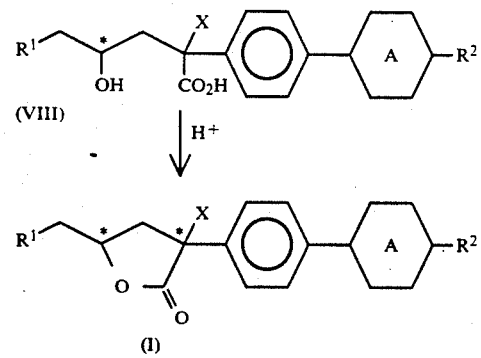

First, an acetophenone derivative (IV) synthsised by a customary manner is subjected to Willgerodt reaction to produce a phenylacetic acid derivative (V) which is then subjected to react with lithium diisopropylamide (LDA) of double molar ratio at −30 to +10° C. followed by an optically active epoxy compound (VII) of 0.3 to 3 molar ratio at −78° C. to room temperature, so that addition compound (VIII) (wherein X is a hydrogen atom) can be obtained. The compound (VIII) is then subjected to intramolecular dehydrogenation in solvent such as benzene or toluene at the presence of acid catalyst such as sulfuric acid, hydrochloric acid or paratoluenesulfonate to provide the compound represented by the formula (I) which is an optically active γ-lactone derivative.

A compound in which X in the addition compound (XIII) is —CH₃ can be obtained in such a manner that the phenylacetic acid derivative (V) is reacted with lithium diisopropylamide (LDA) and then with methyl iodide (MeI) to produce a phenylmethylacetic acid derivative (VI) which is then reacted with lithium diisopropylamide (LDA) and further with the optical active epoxy compound (VII).

In the optical acitive epoxy compound (VII) used in the reaction abovementioned, the compounds (VII)-(1) wherein R1 represents an alkyl group may be obtained by the following reaction.

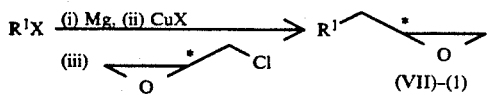

wherein $R^1$ represents an alkyl group, * represents an asymmetric carbon atom and X represents a halogen atom.

In this scheme, the reaction between the alkyl halide or halogenated alkenyl ($R^1X$) with magnesium produces Grignard's reagent which is then reacted with optical active epichlorohydrine under the presence of copper halide (CuX) to produce the optically active epoxy compound (VII)-(1).

In the optically acitive epoxy compound (VII), the compounds (VII)-(2) wherein $R^1$ represents an alkyloxy group may be obtained by the following reaction.

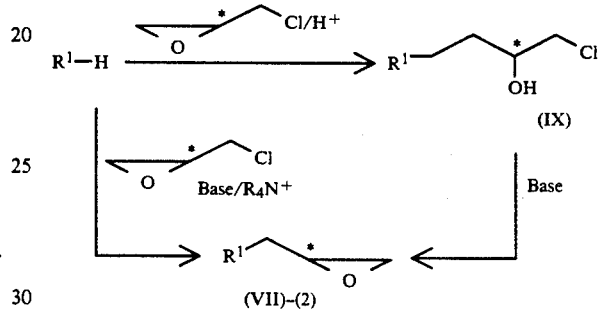

wherein $R^1$ represents an alkyloxy group, and * represents an asymmetric carbon atom.

That is, the reaction may be composed of two steps or a single step method. The two step method is conducted by such a manner that an alcohol ($R^1$-H) is caused to react with optical active epichlorohydrine at the presence of acidic catalyst to synthesize chlorohydrinether (IX) which is then subjected to cyclization with alkali. The single step method is carried out in such a manner that the alcohol is reacted with optically active epichlorohydrine and a base under the presence of quaternary ammonium salt catalyst.

The abovesaid optically active epoxy compound (VII) may also be produced by a method of utilizing the reaction of olefin with air by the use of microorganism.

The optical active epichlorohydrine may be employed of high purity as obtained by the method disclosed in Japanese Unexamined Patent Publication Nos. SHO 61-132196 and 62-6697.

The compounds represented by the general formula (I) and (II) may include those not exhibiting liquid crystal phase. Even when exhibiting liquid crystal phase, the compounds are not necessarily pratical in a view point of the temperature range in which the liquid crystal phase sequence or smectic C phase is exhibited, so that the compounds (I) and (II) may be preferably used in combination with other liquid crystal compounds in comparison with being solely used. Particularly, the compounds represented by the general formula (I) and (II) may suitably be added at a proper amount into a non-chiral smectic liquid crystal compound or composition, or a chiral smectic liquid crystal compound or composition to thereby provide a ferroelectric liquid crystal composition having a larger spontaneous polarization and showing a high-speed response. In this case, the addition amount of the compounds represented by the general formula (I) and (II) is each preferably 0.1 to 20 wt % and most preferably 0.5 to 5 wt %. When the addition amount is more than 20 wt %, it may often lead to practical problems that the compounds added are crystalized in the ferroelectric liquid crystal composition or upper limit temperature of smectic C phase is lowered, while when addition is less than 0.1 wt %, a sufficient effect cannot be developed in response speed.

As liquid crystal compounds to be used in combination with the compounds represented by the general formula (I) and (II), such known compounds may be applied as represented by the following general formula (X) to (XII):

$$R^7-Z^1-B^1-D^1-B^2-Z^2-R^8 \quad (X)$$

$$R^7-Z^1-B^1-D^1-B^2-D^2-B^2-Z^2-R^8 \quad (XI)$$

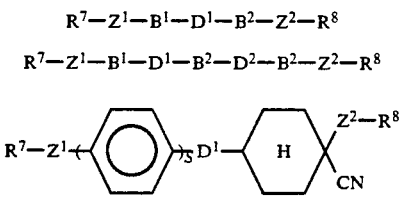
(XII)

wherein $B^1$, $B^2$ and $B^3$ independently represent a six members cyclic ring such as benzen ring, cyclohexane ring, bicyclo [2.2.2] octane ring, pyridine ring, pyrimidine ring, pyrazine ring, dioxacyclohexane ring, and naphthalene ring, provided that hydrogen atoms in the ring may be substituted with fluorine atom, chlorine atom, bromine atom, cyano group, nitro group, methyl group, methoxy group or the like. $D^1$ and $D^2$ each represents a single bond, or a group of —COO—, —OCO—, —CH=CH—, —C≡C—, —CH=CH—COO—, —OCO—CH=CH—, —CH$_2$CH$_2$—, —OCH$_2$—, —CH$_2$O—, —COS— or —SCO—. $Z^1$ and $Z^2$ each represents a single bond or a group of —COO—, —OCO—, —O—, —S—, —OCOO— or —CO—. $R^7$ and $R^8$ each represents an alkyl group with straight or branched chain having 1 to 15 carbon atoms which may contain an asymmetic carbon atom. s represents an interger of 1 or 2.]

Among them, the pyrimidine compound represented by the general formula (III):

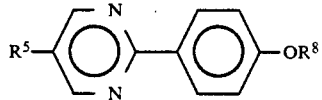
(III)

wherein $R^5$ and $R^6$ each represents an alkyl or alkoxy group having 1 to 15 carbon atoms, is liable to stably exhibit a smectic C phase and therefore may preferably be used in combination with the compounds (I) and (II) to produce a ferroelectric liquid crystal composition of good property.

Examples of the alkyl group or alkyloxy group of $R^5$ and $R^6$ include the same groups as explained for $R^1$ and $R^2$.

In the preparation of the ferroelectric liquid crystal composition by using those compounds, it is required to set a spiral pitch of nematic phase to be sufficiently longer than cell thickness in order to obtain good orientation when the ferroelectric liquid crystal composition is applied to a ferroelectric liquid crystal device. Also, a relationship between spontaneous direction derivating the compounds (I) and (II) and the spiral pitch of nematic phase is as shown in the following table. When the compounds (I) and (II) are combined to have the spiral pitches of nematic phase reversed to each other, direction of spontaneous polarization of the compounds corresponds to each other, resulting in that increase of spontaneous polarization and improvement of response can be expected and good orientation can be obtained due to a resultant longer spiral pitch.

| Compounds | Direction of spontaneous polarization | Direction of spiral of nematic phase |
|---|---|---|
| Compound (I) | − | L |
|  | + | R |
| Compound (II) | + | L |
|  | − | R |

The compounds represented by the general formula (II) may be produced for example by a process published in K. Sakaguchi and T. Kitamura, 2nd International Conference on Ferroelectric Liquid Crystals, P-79 (1989), and an alkyl group represented by $R^3$ and $R^4$ may be the same as aforementioned.

Next, examples of a ferroelectric liquid crystal device of the present invention will be detailed.

FIG. 1 is a sectional view illustrating an example of a ferroelectric liquid crystal device of the present invention using a ferroelectric liquid crystal composition.

FIG. 1 shows an example of transmission type display device, where 1 and 2 are insulating substrates; 3 and 4 are conductive films, 5 is an insulating film; 6 is an orientation control layer; 7 is a sealant; 8 is a ferroelecric liquid crystal composition layer; and 9 is a polarizer.

Photo-transmission substrates are used for the insulating substrates 1 and 2, and generally glass substrates are employed therefor.

The conductive films 3 and 4, which are usually composed of a conductive thin films of $In_2O_3$, $SnO_2$ or ITO (Indium-Tin Oxide), are used as transparent electrodes and are each formed with a predetermined pattern on the insulating substrates 1 and 2.

On the substrates are formed an insulating film 5, but the film 5 may be omitted in some cases. As the insulating film 5, there may be used, for example, inorganic thin film such as of $SiO_2$, $SiN_x$, $Al_2O_3$, etc., and organic thin film such as of polyimide, photoresist resin, polymer liquid crystal, etc. In the case that the insulating film 5 is composed of inorganic thin film, the film 5 may be formed by vacuum deposition process, sputtering process, CVD (Chemical Vapor Deposition) process or solution coating process. In the case that the insulating film 5 is composed of organic thin film, the film 5 may be formed by using a solution dissolving an organic substance or a solution of its precursor according to spin-coating process, immersion application process, screen printing process, roller application process and curing it at predetermined conditions (heating, photoirradiation, etc.); the thin film may also be formed by LB (Langumuir-Blodgett) process as well as deposition process, sputtering process, CVD process.

On the insulating film 5 is formed an orientation control layer 6. In the case that the insulating film 5 is omitted, the orientation control layer 6 may be formed directly on the conductive films 3 and 4. As the orientation control layer 6, inorganic layer may be used in some cases, while organic layer may be also used in other cases.

In the case that an inorganic orientation control layer is used, slant deposition of silicone oxide is commonly conducted for the formation thereof. Rotating deposition may be also conducted. In the case that an organic orientation control layer is employed, nylon, polyvinylalcohol, polyimide and the like may be used. In this case, rubbing treatment is usually effected on the layer. The orientation control layer can also be formed by using a polymer liquid crystal or LB membrane with an intended orientation, by using magnetic field orientating technique or by using spacer edge method. Further, $SiO_2$, $SiN_x$ and the like may be formed by deposition process, sputtering process, CVD process and the like, on which rubbing treatment is effected for providing the orientation control layer.

The two insulating substrates are laminated together through a predetermined clearance, and then liquid crystal is injected therebetween to produce a ferroelectric liquid crystal device.

Figure 2:
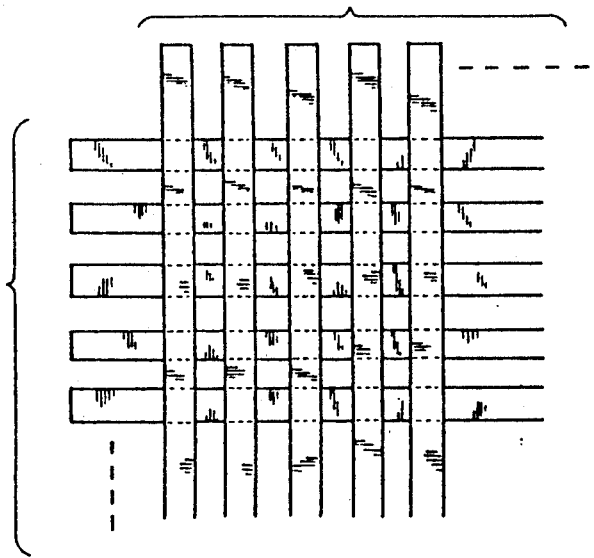
FIG. 2 is a plan view illustrating a constitution of a large capacity ferroelectric liquid crystal device of another embodiment of the present invention.

In FIG. 1, although the ferroelectric liquid crystal device of the present invention is explained as a switching element with one pixel, the ferroelectric liquid crystal device of the present invention may be also applied to a display device with a large capacity matrix wherein the wirings (electrodes) on the upper substrate together with the wirings (electrodes) on the lower substrate are intersectionally placed as to provide a matrix type device structure, as is shown in a plane schematic view of FIG. 2. Such a matrix-type liquid crystal device may be driven by various driving methods which have been proposed currently [See for example, Wakita, Kamimura, Onishi, Oba, Kobayashi, Ota, National Technical Report, 33, 44 (1987)].

EXAMPLES

Synthesis of the compound represented by the general formula (VII) (Synthetic Examples 1 to 4)

Synthetic Example 1

Synthesis of (R)-1,2-epoxynonane

In a reactor, suspension of 1.9 g (10 mmol) of cuprous iodide in 75 ml of ether was introduced, to which was added Grignard reagent that had been produced in 75 ml of tetrahydrofuran by the reaction of 12.38 g (75 mmol) of hexylbromide with 2 g (82.5 mmol) of magnesium under nitrogen stream at −30° C. The mixture was stirred for 30 min, to which was added 100 ml of a solution of 4.63 g of R-epichlorohydrine (50 mmol, more than 93.5% in chemical purity, more than 99% in optical purity ($[\alpha]D^{25}=-34.0°$, C=1.2, methanol)) in tetrahydrofuran-ether (1:1). The reaction mixture was stirred for 2 hours at the same temperature as abovementioned. After completion of reaction, to the reaction mixture was added 100 ml of saturated ammonium chloride solution for cooling the mixture to room temperature, and then the organic layer was extracted into ether followed by washing with saturated brine and drying over sulfuric anhydride magnesium. The residue after distilling off the solvents from the organic layer at reduced pressure was vacuum distilled to obtain 6.29 g of (R)-chlorohydrine (35.2 mmol, 70% of yield) represented by the following formula.

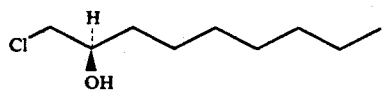

$[\alpha]D^{25}$: +8.20° (neat).
bp: 60 to 66° C. (14 mmHg, Kugelrohr).
IR: $\nu$ max (neat) 3,380 $cm^{-1}$.

NMR ($CDCl_3$): δ: 0.7 to 1.8 (15H, m), 2.2 (1H, brd), 3.3 to 3.9 (3H, m).

A mixture of 4.99 g of the abovesaid (R)-chlorohydrine and 50 ml of 48% sodium hydroxide solution was refluxed under stirring for 2 hours. After completion of reaction, the product was extracted into ether and distilled to obtain 3.97 g of (R)-1,2-epoxy-n-nonane. $[\alpha]D^{25}$: +10.87°.
NMR ($CDCl_3$):
δ: 0.83 (3H, m), 1.2 to 1.6 (12H, m), 2.46 (1H, m), 2.74 (1H, m), 2.91 (1H, m).

SYNTHETIC EXAMPLE 2

Synthesis of (R)-methylglycidylether

To a solution of 0.98 g of sulphuric acid in 100 ml of methanol was added dropwise a solution of 23.66 g of (R)-epichlorohydrine as used in the Synthetic Example 1 in 20 ml of methanol for 20 mins under stirring and refluxing. After continuing the stirring and reflexing for further 20 mins, the reaction solution was cooled to 10° to 15° C. and added dropwise with a solution of 31 g of potassium hydroxide 150 ml methanol followed by stirring for 10 min. The reaction solution was poured in saturated brine, and the product was extracted by methylenechloride and distilled (bp 110° C.) to obtain 4.14 g of (R)-methylglycidylether.
$[\alpha]D^{28}$: +6.49° (C=1.036, $CH_2Cl_2$).
NMR ($CDCl_3$); δ: 2.63 (1H, dd), 3.34 (1H, dd), 2.82 (1H, m), 3.42 (3H, S), 3.16 (1H, m), 3.71 (1H, dd).

SYNTHETIC EXAMPLE 3

Synthesis of (R)-n-hexylglycidylether 6 ml of n-hexanol was added dropwise to a mixture of 40 g of 50% sodium hydroxide solution, 24 g of (R)-epichlorohydrine as used in the Synthetic Example 1 and 400 mg of tetrabutylammoniumhydrogen sulfate, under cooling at 20° to 25° C. The reaction solution was stirred at the same temperature for 3 hours and added with water, and then the product was extracted into ether. The extracted product was distilled under reduced pressure to obtain 3.35 g of (R)-n-hexylglycidylether.
$[\alpha]D^{37}$ −2.43° (C=1.048, $CHCl_3$).
bp: 52° C./4 mmHg.
NMR ($CDCl_3$): δ: 0.89 (3H, m), 3.12 (1H, m), 1.2 to 1.4 (6H, m), 3.36 (1H, dd), 1.58 (2H, m), 3.48 (2H, m), 2.58 (1H, dd), 3 70 (1H, dd), 2.77 (1H, dd).

SYNTHETIC EXAMPLE 4

Synthesis of (S)-allylglycidylether

To a solution of 0.5 g of sulphuric acid in 100 ml of allylylalcohol was added dropwise a solution of 19.54 g of (S)-epichlorohydrine (chemical purity: more than 98.5%, optical purity: more than 99%, ($[\alpha]D^{25}$=+34.0°, C=1.2, methanol)) in 20 ml of allylalcohol for 20 mins under stirring and refluxing followed by further stirring and refluxing for 20 mins. The reaction solution was cooled at 10 to 15° C. and added dropwise with a solution (130 ml) of 25.2 g of potassium hydroxide in methanol and stirred for 10 mins. The reaction solution was poured in saturated brine, and the product was extracted by methylenechloride and distilled (bp 110° C.) to obtain 9.51 g of (S)-allylglycidylether.
$[\alpha]D^{28}$ −9.24° (C=1.075, $CH_2Cl_2$).

NMR (CDCl₃); δ: 2.61 (1H, dd), 4.05 (1H, m), 2.80 (1H, t), 5.20 (1H, d), 3.16 (1H, m), 5.29 (1H, d), 3.40 (1H, dd), 5.91 (1H, m), 3.73 (1H, dd).

Synthesis of the compound represented by the general formula (V) (Synthetic Examples 5 to 7)

Synthetic Example 5

Synthesis of 4-(4'-n-heptyl)-biphenylacetate 10.85 g of 4-acetyl-4'-n-heptylbiphenyl and 2.36 g of sulfur were refluxed under stirring in 20 ml morpholine for 9 hours. To the reaction solution was added a solution of 29.5 g of sodium hydroxide in 30 ml water and 100 ml ethanol. After stirring for 9 hours, the reaction solution was poured into water followed by acidifying with hydrochloric acid. Precipitated solid was collected through filtration to obtain 13.51 g of crude product which was then purified by silica gel column chromatography to obtain 8.29 g of the object compound.

mp; 154 to 162° C.

IR (Nujol) 1724 cm⁻¹.

NMR (CDCl₃); δ: 0.88 (3H, m) 3.68 (2H, s) 1.2 to 1.4 (8H, m) 7.23 (2H, d) 1.64 (2H, m) 7.33 (2H, d) 2.63 (2H, t) 7.48 (2H, d) 7.54 (2H, d)

SYNTHETIC EXAMPLE 6

Synthesis of 4-(4'-n-nonyloxy)-biphenylacetate 10.14 g of 4-acetyl-4'-n-nonyloxybiphenyl and 1.536 g of sulfur were refluxed under stirring in 20 ml of morpholine for 15 hours. To the reaction solution was added a solution of 25 g of sodium hydroxide in 30 ml water and 100 ml ethanol followed by stirring for 9 hours. The solution was then poured in water followed by acidifying with hydrochloric acid. Precipitated solid was collected through filtration to obtain a crude product which was then purified by silica gel column chromatography to obtain 12.84 g of the object compound.

mp 175 to 176° C.

IR (Nujol) 1704 cm⁻¹.

NMR (CDCl₃):

89 (3H, m), 3.99 (2H, t) δ: 0.89 (3H, m), 3.99 (2H, t), 1.2 to 1.5 (12H, m), 6.95 (2H, d), 1.80 (2H, m), 7.33 (2H, d), 3.69 (2H, s), 7.49 (2H, d), 7.52 (2H, d).

SYNTHETIC EXAMPLE 7

Synthesis of 4-(4'-n-butyl-trans-cyclohexyl) phenylacetate 5 g of 4-(4'-n-butyl-trans-cyclohexyl)acetophenone and 1.24 g of sulfur were refluxed under stirring in 7.5 ml of morpholine for 11 hours. To the reaction solution was added a solution of 16.7 g of sodium hydroxide in 43.4 ml water and 67 ml of ethanol and stirred for 7 hours. The solution was then poured in water followed by acidifying with hydrochloric acid. The product was extracted into ether and extracted crude product was then purified by silica gel column chromatography to obtain 3.33 g of the object compound.

mp; 72 to 74° C.

IR (Nujol) 1718 cm⁻¹.

NMR (CDCl₃): δ: 0.8 to 1.5 (14H, m), 3.59 (2H, s), 1.86 (4H, m), 7.17 (4H, m), 2.44 (1H, t).

SYNTHESIS OF THE COMPOUND REPRESENTED BY THE GENERAL FORMULA (IV)

Synthetic Example 8

Synthesis of 2-(4'-nonyloxy-4-biphenyl) propionic acid

In a vessel containing 506 g of diisopropylamine and 10 ml of tetrahydrofuran cooled at −73° C., a solution of 15% n-butyl lithium in 3 ml hexane was added dropwise while gradually increasing temperature to 0° C. and stirred for 30 mins. To the reaction solution was added dropwise a solution of 708 mg of 4-(4'-n-nonyloxy)-biphenylacetate, as synthetized in the Synthetic Example 6, in 8 ml tetrahydrofuran, followed by stirring for 1 hour. The reaction solution was then cooled to −78° C., to which was added dropwise a solution of 426 mg of methyl iodide in 2 ml tetrahydrofuran. The reaction solution was stirred for 6 hours while gradually increasing temperature to room temperature, and added with water followed by acidifying with hydrochloric acid and extraction by chloroform to obtain 730 mg of the object compound.

NMR (CDCl₃); δ: 0.89 (3H, t), 3.99 (2H, t), 1.2 to 1.6 (12H, m), 6.95 (2H, d), 1.55 (3H,d), 7.37 (2H, d), 1.80 (2H, m), 7.4 to 7.6 (4H, m), 3.79 (1H, q).

SYNTHESIS OF THE COMPOUND REPRESENTED BY THE GENERAL FORMULA (I)

(Synthetic Examples 9 to 16)

Synthetic Example 9

In a vessel of 113 g of diisopropylamine and 2 ml of tetrahydrofuran cooled at −78° C., a solution of 15% n-butyl lithium in 0.7 ml hexane was added dropwise while gradually increasing temperature to 0° C., and stirred for 30 mins. To the reaction solution was added dropwise a solution of 177 mg of 4-(4'-n-nonyloxy)-biphenylacetate, as synthetized in the Synthetic Example 6, in 2 ml tetrahydrofuran, followed by stirring for 1 hour. The reaction solution was cooled to −78° C., to which was added dropwise a solution of 85 mg of (R)-1,2-epoxynonane, as synthetized in the Synthetic Example 1, in 2 ml tetrahydrofuran. The reaction solution was stirred for 6 hours while gradually increasing temperature to room temperature, and added with water followed by acidifying with hydrochloric acid. The product was extracted by chloroform, and dehydrated benzene and sulfuric acid at a catalytic amount were added thereto. The mixture was stirred under heating for 6 hours while evaporating off the benzene gradually. After cooling, the residue after distilling off the benzene under reduced pressure was purified through silica gel column chromatography to obtain 35 mg and 104 mg of γ-lactone derivatives (2R, 4R) and (2S, 4R), respectively, represented by the following chemical formulae.

(2R, 4R) form

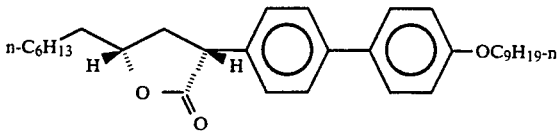

-continued

Phase transition temperature $$C \xrightarrow{126° C.} I$$

$[\alpha]_D^{34}$; $-5.42°$ (C=1.66, CH$_2$Cl$_2$).

NMR (CDCl$_3$); δ: 0.89 (6H, m), 4.48 (1H, m), 1.2 to 1.9 (26H, m), 6.95 (2H, d), 2.05 (1H, td), 7.31 (2H, d), 2.74 (1H, ddd), 7.48 (2H, d), 3.88 (1H, dd), 7.53 (2H, d), 3.98 (2H, t).

IR (Nujol) 1750 cm$^{-1}$.

(2R, 4R) form

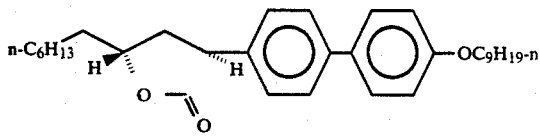

Phase transition temperature

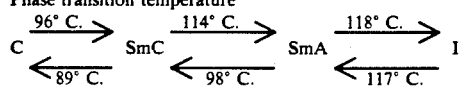

$[\alpha]_D^{34}$ $-29.33°$: (C=0.95, CH$_2$Cl$_2$).

NMR (CDCl$_3$): δ: 0.89 (6H, m), 4.66 (1H, m), 1.2 to 1.9 (26H, m), 6.96 (2H, d), 2.41 (1H, ddd), 7.32 (2H, d), 2.53 (1H, dt), 7.48 (2H, d), 3.93 (1H, dd), 7.53 (2H, d), 3.99 (2H, t).

IR (Nujol) 1750 cm$^{-1}$.

SYNTHETIC EXAMPLE 10

In a vessel containing 339 g of diisopropylamine and 6 ml of tetrahydrofuran cooled at $-78°$ C., a solution of 15% n-butyl lithium in 2.1 ml hexan was added dropwise while gradually increasing temperature to 0° C., and stirred for 30 mins. To the reaction solution was added dropwise a solution of 531 mg of 4-(4'-n-nonyloxy)-biphenylacetate, as synthetized in the Synthetic Example 6, in 5 ml tetrahydrofuran, followed by stirring for 1 hour. The reaction solution was cooled to $-78°$ C., to which was added dropwise a solution of 256 mg of (R)-n-hexylglycidylether, as synthetized in the Synthetic Example 3, in 1 ml of tetrahydrofuran. The reaction solution was stirred for 6 hours while gradually increasing temperature to room temperature, and added with water followed by acidifying with hydrochloric acid. The product was then extracted by chloroform, and dehydrated benzene and sulfuric acid at a catalytic amount were added to the extraction followed by stirring under heating for 6 hours while evaporating the benzene gradually. After cooling, the residue after distilling off the benzene under reduced pressure was purified through silica gel column chromatography to obtain 259 mg and 207 mg of γ-lactone derivatives (2R, 4S) and (2S, 4S), respectively, represented by the following chemical formulae.

(2R, 4S) form

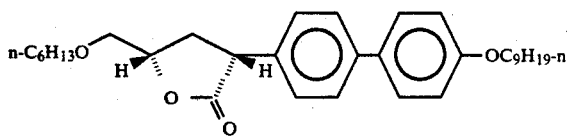

Phase transition temperature

-continued $$C \xrightarrow{92° C.} I$$

$[\alpha]_D^{23}$: $+1.36°$ (C=1.06, CH$_2$Cl$_2$).

NMR (CDCl$_3$): δ: 0.89 (6H, m), 3.70 (1H, dd), 1.2 to 1.5 (18H, m), 3.89 (1H, dd), 1.58 (2H, m), 3.97 (2H, t), 1.78 (2H, m), 4.63 (1H, m), 2.32 (1H, td), 6.95 (2H, d), 2.66 (1H, ddd), 7.23 (2H, d), 3.51 (2H, t), 7.48 (2H, d), 3.61 (1H, dd), 7.52 (2H, d).

(2S, 4S) form

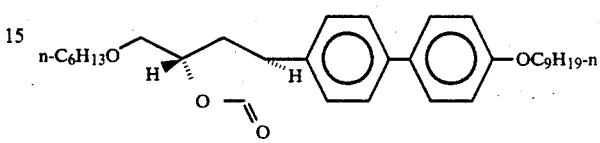

Phase transition temperature

$[\alpha]_D^{32}$: $+29.27°$ (C=1.16, CH2C12).

NMR (CDCl$_3$): δ: 0.89 (6H, m), 3.68 (1H, dd), 1.2 to 1.5 (18H, m), 3.97 (2H, t), 1.58 (2H, m), 4.06 (1H, t), 1.78 (2H, m), 4.72 (1H, m), 2.47 (1H, td), 6.94 (2H, d), 2.65 (1H, ddd), 7.30 (2H, d), 3.49 (2H, t), 7.48 (2H, d), 3.59 (1H, dd), 7.52 (2H, d),

SYNTHETIC EXAMPLE 11

In a vessel containing 505 g of diisopropylamine and 10 ml of tetrahydrofuran cooled at $-78°$ C., a solution of 15% n-butyl lithium in 3 ml hexane was added dropwise while gradually increasing temperature to 0° C., and stirred for 30 mins. To the reaction solution was added dropwise a solution of 700 mg of 4-(4'-n-heptyl)-biphenylacetate, as synthetized in the Synthetic Example 5, in 6 ml tetrahydrofuran, followed by stirring for 1 hour. The reaction solution was cooled to $-78°$ C., to which was added dropwise a solution of 260 mg of commercially available (R)-1,2-cpoxyhepthane ($[\alpha]_D^{25}+15.0°$ <neat>) in 1 ml of tetrahydrofuran. The reaction solution was stirred for 6 hours while gradually increasing temperature to room temperature, and added with water followed by acidifying with hydrochloric acid. The product was extracted by chloroform, and then dehydrated benzene and sulfuric acid at a catalytic amount were added to the extraction followed by stirring under heating for 6 hours while evaporating the benzene gradually. After cooling, the residue after distilling off the benzene under reduced pressure was purified through silica gel column chromatography to obtain 330 mg and 383 mg of γ-lactone derivatives (2R, 4S) and (2S, 4S), respectively, represented by the following chemical formulae.

(2R, 4R) form

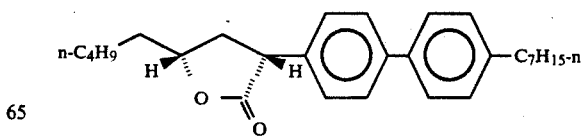

Phase transition temperature

-continued

C $\xrightarrow{102° C.}$ I

[α]$D^{27}$: −5.66° (C=1.089, CH$_2$Cl$_2$).

NMR (CDCl$_3$): δ: 0.90 (6H, m), 4.51 (1H, m), 1.20 to 1.85 (18H, m), 7.25 (2H, d), 2.08 (1H, dt), 7.34 (2H, d), 2.63 (2H, t), 7.49 (2H, d), 2.78 (1H, m), 7.57 (2H, d), 3.92 (1H, dd).

(2S, 4R) form

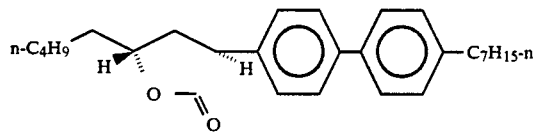

Phase transition temperature

C $\xrightarrow{99° C.}$ I

[α]$D^{28}$: +33.48° (C=1.027, CH$_2$Cl$_2$).

NMR (CDCl$_3$): δ: 0.90 (6H, m), 7.25 (2H, d), 1.2 to 1.9 (18H, m), 7.34 (2H, d), 2.35 to 2.68 (4H, dt), 7.48 (2H, d), 3.94 (1H, dd), 7.57 (2H, d), 4.67 (1H, m),

SYNTHETIC EXAMPLE 12

In a solution of 505 mg of diisopropylamine in 10 ml of tetrahydrofuran cooled at −78° C., a solution of 15% n-butyl lithium in 3 ml hexane was added dropwise while gradually increasing temperature to 0° C., and stirred for 30 mins. To the reaction solution was added dropwise a solution of 600 mg of 4-(4'-n-butyl-trans-cyclohexyl) phenylacetate, as synthetized in the Synthetic Example 7, in 3 ml tetrahydrofuran, followed by stirring for 1 hour. The reaction solution was cooled to −78° C., to which was added dropwise a solution of 275 mg of (S)-allylglycidylether, as synthetized in the Synthetic Example 4, in 1 ml of tetrahydrofuran. The reaction solution was then stirred for 6 hours while gradually increasing temperature to room temperature, and added with water followed by acidifying with hydrochloric acid. The product was extracted by chloroform, and then dehydrated benzene and sulfuric acid at a catalytic amount were added to the extraction followed by stirring under heating for 6 hours while evaporating off the benzene gradually. After cooling, the residue after distilling off benzene under reduced pressure was purified through silica gel column chromatography to obtain 320 mg and 246 mg of γ-lactone derivatives (2S, 4R) and (2R, 4R), respectively, represented by the following chemical formulae.

(2S, 4R) form

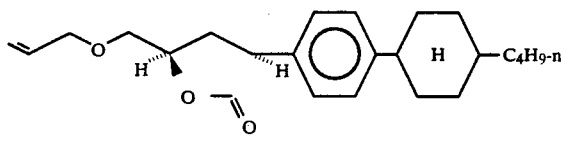

Phase transition temperature

C $\xrightarrow{107° C.}$ I

[α]$D^{28}$: −3.22° (C=1.033, CH$_2$Cl$_2$).

NMR (CDCl$_3$): δ: 0.8 to 1.5 (14H, m), 4.09 (2H, m), 1.86 (4H, m), 4.65 (1H, m), 2.30 (1H, dt), 5.22 (1H, m), 2.45 (1H, m), 5.30 (1H, m), 2.68 (1H, m), 5.91 (1H, m), 3.62 to 3.76 (2H, m), 7.20 (4H, s), 3.86 (1H, dd).

(2S, 4R) form

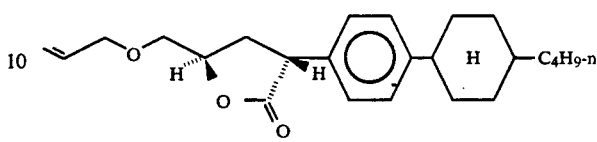

Phase transition temperature

C $\xrightarrow{76° C.}$ I

[α]$D^{28}$: −40.42° (C=1.024, CH$_2$Cl$_2$).

NMR (CDCl$_3$): δ: 0.8 to 1.5 (14H, m), 4.75 (1H, m), 1.86 (4H, m), 5.22 (1H, m), 2.37 to 2.55 (2H, dt), 5.29 (1H, m), 2.65 (1H, m), 5.91 (1H, m), 3.60 to 3.76 (2H, m), 7.19 (4H, s), 3.95 to 4.1 (3H, m).

SYNTHETIC EXAMPLE 13

In a solution of 505 g of diisopropylamine in 10 ml of tetrahydrofuran cooled at −78° C., a solution of 15% n-butyllithium in 3 ml hexane was added dropwise while gradually increasing temperature to 0° C., and stirred for 30 mins. To the reaction solution was added dropwise a solution of 600 mg of 4-(4'-n-butyl-trans-cyclohexyl) phenylacetate, as synthetized in Synthetic Example 7, in 3 ml tetrahydrofuran, followed by stirring for 1 hour. The reaction solution was cooled to −78° C., to which was added dropwise a solution of 477 mg of commercially available (R)-1,2-epoxytridecane ([α]$D^{25}$+9.8° <neat>) in 1 ml of tetrahydrofuran. The reaction solution was stirred for 6 hours while gradually increasing temperature to room temperature, and added with water followed by acidifying with hydrochloric acid. The product was extracted by chloroform, and then dehydrated benzene and sulfuric acid at a catalytic amount were added to the extraction followed by stirring under heating for 6 hours while evaporating off the benzene gradually. After cooling, the residue after distilling off the benzene under reduced pressure was purified through silica gel column chromatography to obtain 320 mg and 246 mg of γ-lactone derivatives (2S, 4R) and (2R, 4R), respectively, represented by the following chemical formulae.

(2R, 4R) form

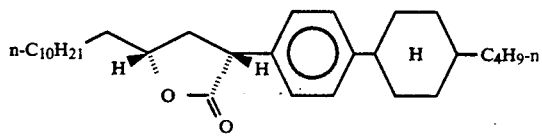

Phase transition temperature

C $\xrightarrow{116° C.}$ I

[α]$D^{28}$: −3.57° (C=1.035, CH$_2$Cl$_2$).

NMR (CDCl$_3$): δ: 0.8 to 1.9 (41H, m), 3.83 (1H, dd), 2.02 (1H, dt), 4.47 (1H, m), 2.45 (1H, m), 7.20 (4H, s), 2.72 (1H, m).

(2S, 4R) form

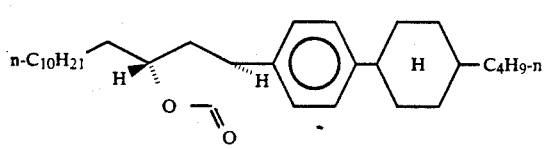

Phase transitioh temperature

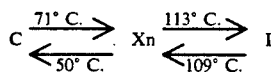

$[\alpha]_D^{24}$: +31.02° (C=1.038, CH$_2$Cl$_2$).

NMR (CDCl$_3$): δ: 0.8 to 1.9 (41H, m), 4.62 (1H, m), 2.28 to 2.55 (3H, m), 7.19 (4H, s), 3.87 (1H, dd).

SYNTHETIC EXAMPLE 14

In a solution of 505 g of diisopropylamine in 10 ml of tetrahydrofuran cooled at −78° C., a solution of 15% n-butyl lithium in 3 ml hexane was added dropwise while gradually increasing temperature to 0° C., and stirred for 30 mins. To the reaction solution was added dropwise a solution of 700 mg of 4-(4'-n-heptyl)-biphenylacetate, as synthetized in the Synthetic Example 5, in 3 ml tetrahydrofuran, followed by stirring for 1 hour. The reaction solution was cooled to −78° C., to which was added dropwise a solution of 212 mg of (R)-methylglycidylether, as synthetized in the Synthetic Example 2, in 1 ml of tetrahydrofuran. The reaction solution was stirred for 6 hours while gradually increasing temperature to room temperature, and added with water followed by acidifying with hydrochloric acid. The product was extracted by chloroform, and then dehydrated benzene and sulfuric acid at a catalytic amount were added to extraction followed by stirring under heating for 6 hours while evaporating off the benzene gradually. After cooling, the residue after distilling off benzene under reduced pressure was purified through silica gel column chromatographyto obtain 113 mg and 255 mg of γ-lactone derivatives (2R, 4S) and (2S, 4S), respectively, represented by the following chemical formulae.

(2R, 4S) form

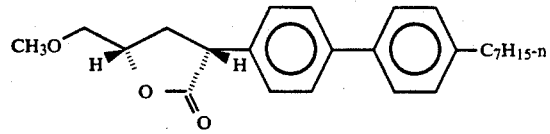

Phase transition temperature

$[\alpha]_D^{21}$: +0.35° (C=1.01, CH$_2$Cl$_2$),

NMR (CDCl$_3$): δ: 0.88 (3H, m), 3.94 (1H, dd), 1.2 to 1.45 (8H, m), 4.67 (1H, m), 1.65 (2H, m), 7.25 (2H, d), 2.34 (1H, dt), 7.36 (2H, d), 2.6 to 2.8 (3H, m), 7.49 (2H, d), 3.46 (3H, s), 7.58 (2H, d), 3.67 (2H, m).

(2S, 4S) form

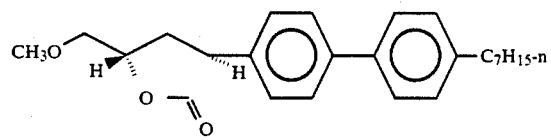

Phase transition temperature

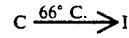

$[\alpha]_D^{23}$: +34.16° (C=1.013, CH$_2$Cl$_2$).

NMR (CDCl$_3$): δ: 0.88 (3H, m), 4.08 (1H, t), 1.2 to 1.45 (8H, m), 4.77 (1H, m), 1.65 (2H, m), 7.24 (2H, d), 2.52 (1H, dt), 7.33 (2H, d), 2.59 to 2.75 (3H, m), 7.48 (2H, d), 3.44 (3H, s), 7.57 (2H, d), 3.65 (2H, m).

SYNTHETIC EXAMPLE 15

In a solution of 505 g of diisopropylamine in 10 ml of tetrahydrofuran cooled at −78° C., a solution of 15% n-butyl lithium in 3 ml hexane was added dropwise while gradually increasing temperature to 0° C., and stirred for 30 mins. To the reaction solution was added dropwise a solution of 730 mg of 4-(4'-n-nonyloxy-4-biphenyl) propionic acid, as synthetized in the Synthetic Example 8, in 8 ml tetrahydrofuran, followed by stirring for 1 hour. The reaction solution was cooled to −78° C., to which was added dropwise a solution of 312 mg of (R)-1,2-epoxynonane, as synthetized in the Synthetic Example 1, in 1 ml of tetrahydrofuran. The reaction solution was stirred for 6 hours while gradually increasing temperature to room temperature, and added with water followed by acidifying with hydrochloric acid. The product was extracted by chloroform, and then dehydrated benzene and sulfuric acid at a catalytic amount were added to extraction followed by stirring under heating for 6 hours while evaporating off the benzene gradually. After cooling, the residue after distilling off benzene under reduced pressure was purified through silica gel column chromatography to obtain 408 mg and 280 mg of γ-lactone derivatives (2R, 4R) and (2S, 4R), respectively, represented by the following chemical formulae.

(2R, 4R) form

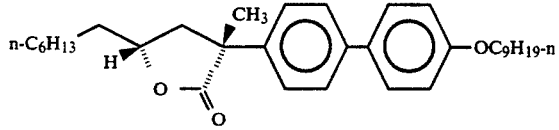

Phase transition temperature

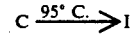

$[\alpha]_D^{25}$: +13.24° (C=1.06, CH$_2$Cl$_2$).

NMR (CDCl$_3$): δ: 0.88 (6H, m), 2.50 (1H, dd), 1.2 to 1.7 (24H, m), 3.99 (2H, t), 1.67 (3H, s), 4.57 (1H, m), 1.79 (2H, m), 6.96 (2H, d), 2.33 (1H, dd), 7.45 to 7.55 (6H, m).

(2S, 4R) form

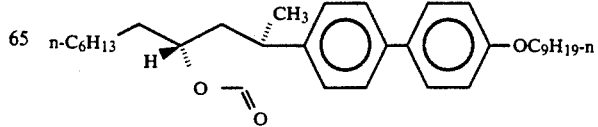

-continued

Phase transition temperature

C $\xrightarrow{72° C.}$ I $[\alpha]_D^{23}$: +25.11° (C=1.017, CH$_2$Cl$_2$).

NMR (CDCl$_3$): δ: 0.88 (6H, m), 2.77 (1H, dd), 1.15 to 1.70 (24H, s), 3.99 (2H, t), 1.61 (3H, s), 4.24 (1H, m), 1.78 (2H, m), 6.96 (2H, d), 1.99 (1H, dd), 7.35 to 7.60 (6H, m),

SYNTHETIC EXAMPLE 16

In a solution of 505 g of diisopropylamine in 10 ml of tetrahydrofuran cooled at −78° C., a solution of 15% n-butyl lithium in 3 ml hexane was added dropwise while gradually increasing temperature to 0° C., and stirred for 1 hour. To the reaction solution was added dropwise a solution of 682 mg of 4-(4'-n-heptyl)-biphenylacetate, as synthetized in the Synthetic Example 5, in 3 ml tetrahydrofuran, followed by stirring for 1 hour. The reaction solution was cooled to −78° C., to which was added dropwise a solution of 445 mg of (S)-n-hexylglycidyl ether in 1 ml of tetrahydrofuran. The reaction solution was stirred for 6 hours while gradually increasing temperature to room temperature, and added with water followed by acidifying with hydrochloric acid. The product was extracted by chloroform, and then dehydrated benzene and concentrated sulfuric acid at a catalytic amount were added to the extraction followed by stirring under heating for 6 hours while evaporating offc the benzene gradually. After cooling, the residue after distilling off the benzene under reduced pressure was purified through silica gel column chromatography to obtain 401 mg and 465 mg of γ-lactone derivatives (2S, 4R) and (2R, 4R), respectively, represented by the following chemical formulae.

(2S, 4R) form

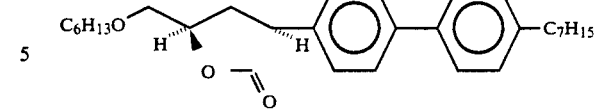

Phase transition temperature

C $\xrightarrow{71° C.}$ I $[\alpha]_D^{22}$: −2.17° (C=1.07, CH$_2$Cl$_2$).

NMR (CDCl$_3$): δ: 0.86 to 0.91 (6H, m), 4.62 to 4.67 (1H, m), 1.29 to 1.61 (18H, m), 7.24 (2H, d, J=8.06 Hz), 2.28 to 2.42 (1H, m), 7.35 (2H, d, J=8.42 Hz), 2.61 to 2.76 (3H, m), 7.48 (2H, d, J=8.42 Hz), 3.52 (2H, t, J=6.60 Hz), 7.57 (2H, d, J=8.06 Hz) 3.61 to 3.75 (2H, m). 3.92 (1H, dd, J=9,16,12.09 Hz).

(2S, 4R) form

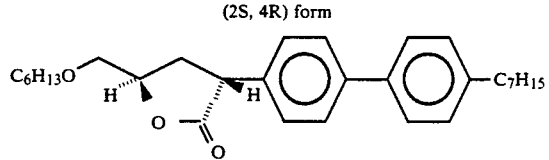

Phase transition temperature

C $\xrightarrow{48° C.}$ I $[\alpha]_D^{22}$: −37.95° (C=1.003, CH$_2$Cl$_2$).

NMR (CDCl$_3$): δ: 0.86 to 0.90 (6H, m), 4.74 to 4.78 (1H, m), 1.29 to 1.60 (18H, m), 7.24 (2H, d, J=8.06 Hz), 2.45 to 2.57 (1H, m), 7.33 (2H, d, J=8.43 Hz), 2.61 to 2.74 (3H, m), 7.48 (2H, d, J=8.43 Hz), 3.51 (2H, t, J=6.68 Hz), 7.57 (2H, d, J=8.06 Hz), 3.60 to 3.75 (2H, m), 4.09 (1H, t, J=9.35 Hz).

EXAMPLES

The present invention was practicized by using the compounds produced in accordance with the aforesaid Synthetic Examples and represented by Nos. 1 to 12 of the formula (I) in Table 1.

TABLE 1

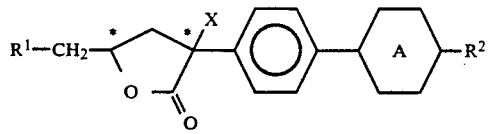

(I)

| No. | R$_1$ | X | A | R$_2$ | Configuration *4 | *2 | $[\alpha]_D$ | Phase Transition temperature (°C.) C  S$_C$ S$_A$  I | Corresponding Synthetic Examples Nos. |
|---|---|---|---|---|---|---|---|---|---|
| 1 | C$_4$H$_9$— | H | ⬡ | —C$_7$H$_{15}$ | R | R | −5.66 | • 102 — — • | 11 |
| 2 | C$_6$H$_{13}$— | H | ⬡ | —OC$_9$H$_{19}$ | R | R | −5.42 | • 126 — — • | 9 |

TABLE 1-continued (I)

$R^1-CH_2-\overset{*}{C}H-\overset{*}{C}\begin{pmatrix}X\\\\C\end{pmatrix}-\begin{pmatrix}A\end{pmatrix}-R^2$

| No. | R₁ | X | A | R₂ | Configuration *4 *2 | [α]_D | Phase Transition temperature (°C.) C  S_C S_A  I | Corresponding Synthetic Examples Nos. |
|---|---|---|---|---|---|---|---|---|
| 3 | C₆H₁₃— | H | ⬡ | —OC₉H₁₉ | R  S | +29.33 | • 96 • 114 • 118 • | 9 |
| 4 | C₁₀H₂₁— | H | ⬡H | —C₄H₉ | R  R | −3.57 | • 116 — — • | 13 |
| 5 | CH₃O— | H | ⬡ | —C₇H₁₅ | S  R | +0.35 | • 68 — — • | 14 |
| 6 | C₆H₁₃O— | H | ⬡ | —C₇H₁₅ | R  S | −1.63 | • 71 — — • | 16 |
| 7 | C₆H₁₃O— | H | ⬡ | —C₇H₁₅ | R  R | −37.95 | • 48 — — • | 16 |
| 8 | C₆H₁₃O— | H | ⬡ | —OC₉H₁₉ | S  R | +1.36 | • 92 — — • | 10 |
| 9 | C₆H₁₃O— | H | ⬡ | —OC₉H₁₉ | S  S | +29.27 | • 64 — — • | 10 |
| 10 | CH₂=CH—CH₂O— | H | ⬡H | —C₄H₉ | R  S | −3.22 | • 107 — — • | 12 |
| 11 | C₆H₁₃— | CH₃ | ⬡ | —OC₉H₁₉ | R  R | +13.24 | • 95 — — • | 15 |
| 12 | C₆H₁₃— | CH₃ | ⬡ | —OC₉H₁₉ | R  S | +25.11 | • 72 — — • | 15 |

First produced was liquid crystal composition No. 13 of non-chiral smectic C phase shown in Table 2. Then, to the liquid crystal composition No. 13 (the mixture of compounds represented by the formula (III)) was added 2 wt % of each of the compounds Nos. 1 to 12 shown in Table 1 to form twelve kinds of ferroelectric liquid crystal compositions.

C7H15—[pyrimidine]—[phenyl]—OC7H15  5%

C7H15—[pyrimidine]—[phenyl]—OC8H17  10%

C7H15—[pyrimidine]—[phenyl]—OC9H19  15%

C8H17—[pyrimidine]—[phenyl]—OC8H17  20%

C8H17—[pyrimidine]—[phenyl]—OC10H21  30%

C9H19—[pyrimidine]—[phenyl]—OC8H13  20%

Next, on two glass substrates were each deposited ITO film and further formed SiO2 on which PVA film was coated and rubbing was effected thereover. Then, the two glass substrates were laminated with each other as having 2 μm of cell thickness and the same rubbing direction, and the ferroelectric liquid crystal compositions prepared as above were each injected between the substrates. After injection of the compositions, the cell was first heated to the temperature enabling to the liquid crystal composition to change to isotropic liquid, and then cooled to room temperature at 1° C./min to obtain a ferroelectric liquid crystal device of good orientation. Properties of the ferroelectric liquid crystal device are as shown in Table , wherein response speed was measured in a time when transmitted light changes at 50% from application of rectangular wave voltage of $V_{p-p}=20V$.

TABLE 3

Properties of Ferroelectric Liquid Crystal Compositions provided by addition of 2 wt % optically active compound into liquid crystal composition No. 13

| Added composition No. | Phase transtion temperature (°C.) | | | | Response speed (μsec) | Tilt angle θ | Memory angle 2θ |
|---|---|---|---|---|---|---|---|
| | $S_C$ | $S_A$ | N | I | | | |
| 1 | • 52 | • 61 | • 68 | • | 100 | 21 | 12 |
| 2 | • 52 | • 62 | • 69 | • | 138 | 21 | 12 |
| 3 | • 53 | • 62 | 69 | • | 325 | 8 | 11 |
| 4 | • 51 | • 61 | • 68 | • | 750 | 10 | 15 |
| 5 | • 50 | • 60 | • 68 | • | 139 | 20 | 14 |
| 6 | • 52 | • 60 | • 67 | • | 146 | 19 | 11 |
| 7 | • 51 | • 60 | • 67 | • | 230 | 17 | 11 |
| 8 | • 53 | • 61 | • 68 | • | 132 | 19 | 14 |
| 9 | • 53 | • 61 | • 68 | • | 214 | 16 | 12 |
| 10 | • 49 | • 59 | • 67 | • | 236 | 19 | 12 |
| 11 | • 50 | • 60 | • 67 | • | 266 | 19 | 13 |
| 12 | • 47 | • 59 | • 66 | • | 124 | 18 | 11 |

As seen in Table 3, high-speed response was obtained by the use of the liquid crystal composition. Also, the concentration of optically active compounds is low as 2 wt % in the ferroelectric liquid crystal compositions, so that a spiral pitch of nematic phase is longer than cell thickness and good orientation can be obtained.

Next, the compounds Nos. 1 to 12 shown in Table 1, that No. 13 shown in Table 2, and those Nos. 14 to 17 shown in Table 4 were combined as having a sufficiently longer sprical pitch of nematic phase in comparison with cell thickness to produce the ferroelectric compositions Nos. 18 and 19 shown in Table 5.

Ferroelectric liquid crystal devices were fabricated similarly with the aforesaid example and evaluated in their properties. Table 5 also shows phase transition temperature and properties of the ferroelectric liquid crystal compositions.

TABLE 4

| No. | Structure | |
|---|---|---|
| 14 | (2S,4S) C8H17—[phenyl]—[phenyl]—OCH2—[furanone with 2*,4* stereocenters]—CH3 | [Formula(II)] |
| 15 | (2S,4S) C8H17—[phenyl]—[phenyl]—OCH2—[furanone with 2*,4* stereocenters]—C3H7 | [Formula(II)] |
| 16 | (S) C8H17O—[pyrimidine]—[phenyl]—OCH2CH2C*HC2H5 (CH3 branch) | |
| 17 | C8H17O—[phenyl]—[phenyl]—COO—CH2CH2—C8F13 | |

TABLE 5

| No. | Compound | | Phase transition temperature (°C.) | | | | Response speed (μsec) | Tilt angle θ | Memory angle 2θ |
|---|---|---|---|---|---|---|---|---|---|
| | | | $S_C$ | $S_A$ | N | I | | | |
| 18 | Composition No. 13 | (%) 92.4 | •49 | •63 | •67 | • | 71 | 20 | 15 |
| | Compound No. 6 | 1.5 | | | | | | | |
| | Compound No. 14 | 2.0 | | | | | | | |
| | Compound No. 16 | 3.9 | | | | | | | |
| | Compound No. 17 | 0.2 | | | | | | | |
| 19 | Composition No. 13 | (%) 93.1 | •49 | •63 | •67 | • | 86 | 21 | 11 |
| | Compound No. 7 | 1.8 | | | | | | | |
| | Compound No. 15 | 2.0 | | | | | | | |
| | Compound No. 16 | 2.8 | | | | | | | |
| | Compound No. 17 | 0.3 | | | | | | | |

As seen from the above, the ferroelectric liquid crystal composition used in the present invention has a longer spiral pitch of nematic phase to thereby achieve good orientation and high speed response, so that a ferroelectric liquid crystal device of a large capacity related to display and photoswitching can be realized.

What we claimed is:

1. A ferroelectric liquid crystal device comprising a pair of substrates each provided with voltage applying means, at least one of the substrates having an orientation control layer, and a ferroelectric liquid crystal layer disposed between the pair of substrates, the ferroelectric liquid crystal layer comprising at least one compound represented by the following general formula (I):

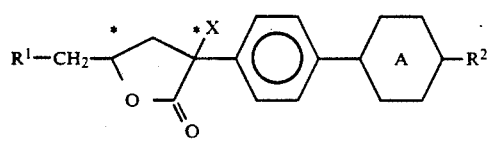
(I)

wherein $R^1$ and $R^2$ may be identical or different from each other and independently represent an alkyl group or an alkyloxy group, having 1 to 15 carbon atoms with straight or branched chains;

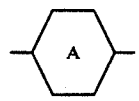

represents

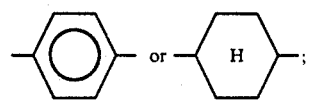

X represents a hydrogen atom or a methyl group, and * represents that the carbon atom is asymmetric,
and at least one compound represented by the following general formula (II):

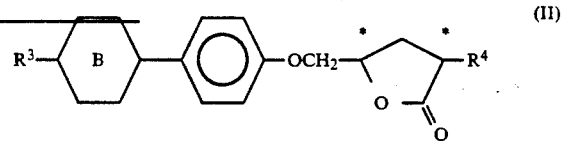
(II)

wherein $R^3$ and $R^4$ may be identical or different from each other and independently represent an alkyl group, having 1 to 15 carbon atoms with straight or branched chains;

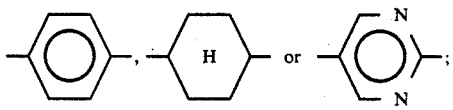

represents

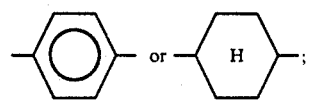

and * represents that the carbon atom is asymmetric.

2. The liquid crystal device of claim 1 in which the ferroelectric liquid crystal layer is composed of a liquid crystal composition including the compounds of the general formula (I) and (II), and a chiral or non-chiral smectic liquid crystal compound or composition.

3. The liquid crystal device of claim 2 in which the content of each of the compounds (I) and (II) is 0.1 to 20 wt % in the composition.

4. The liquid crystal device of claim 2 in which the content of each of the compounds (I) and (II) is 0.5 to 5 wt % in the composition.

5. The liquid crystal device of claim 2 in which the non-chiral smectic liquid crystal compound or composition is a pyrimidine compound represented by the general formula (III) or a mixture thereof:

$$R^5 \text{—} \underset{N}{\overset{N}{\bigcirc}} \text{—} \bigcirc \text{—} OR^6 \quad (III)$$

wherein $R^5$ and $R^6$ each represents an alkyl or alkoxy group having 1 to 15 carbon atoms.

6. The liquid crystal device of claim 1 in which the voltage applying means comprises a plurality of electrodes capable of providing a matrix electrode structure of the liquid crystal device.

7. The liquid crystal device of claim 1 in which the orientation control layer is an organic or inorganic orientation control layer.

* * * * *

UNITED STATES PATENT AND TRADEMARK OFFICE
CERTIFICATE OF CORRECTION

PATENT NO.   : 5,151,214
DATED        : September 29, 1992
INVENTOR(S)  : Koden et al.

It is certified that error appears in the above-identified patent and that said Letters Patent is hereby corrected as shown below:

On the cover sheet, Item 73, add "Daiso Co., Ltd., Osaka, Japan".

Signed and Sealed this

Second Day of August, 1994

Attest:

BRUCE LEHMAN

Attesting Officer         Commissioner of Patents and Trademarks